(12) United States Patent
Cripe (10) Patent No.: US 6,169,339 B1
(45) Date of Patent: Jan. 2, 2001

(54) ROTATING SIGNAL TRANSDUCER (75) Inventor: David Cripe, Camp Point, IL (US)

(73) Assignee: Methode Electronics, Inc., Chicago, IL (US)

(*) Notice: Under 35 U.S.C. 154(b), the term of this patent shall be extended for 0 days.

(21) Appl. No.: 09/282,223

(22) Filed: Mar. 31, 1999

(51) Int. Cl.[7] .............................. B60R 21/32; H01F 27/42
(52) U.S. Cl. ...................... 307/17; 280/735; 336/DIG. 2; 439/950
(58) Field of Search ................................... 307/10.1, 9.1, 307/104, 17; 439/15, 950; 336/DIG. 2; 280/735, 728.1; 340/310.07

(56) References Cited

U.S. PATENT DOCUMENTS

| | | | |
|---|---|---|---|
| 4,242,666 | 12/1980 | Reschovsky et al. | 340/870 |
| 4,316,158 | 2/1982 | Akita et al. | 331/111 |
| 4,466,695 | 8/1984 | Kruger | 350/96.2 |
| 4,558,320 | 12/1985 | Pedrazza | 340/870 |
| 4,623,889 | 11/1986 | Tanaka et al. | 340/870 |
| 4,692,721 | 9/1987 | Ito et al. | 333/109 |
| 4,766,326 | * 8/1988 | Hayashi et al. | 307/10.1 |
| 4,953,932 | 9/1990 | Mihich | 350/96.15 |
| 5,111,142 | 5/1992 | Mazzone et al. | 324/262 |
| 5,192,923 | 3/1993 | Komatsu | 333/116 |
| 5,594,176 | 1/1997 | Kiefer | 73/623 |
| 5,636,863 | 6/1997 | Reid et al. | 280/735 |
| 5,637,973 | 6/1997 | Hirai et al. | 318/640 |
| 5,663,637 | 9/1997 | Li et al. | 324/71.5 |
| 5,810,606 | 9/1998 | Ballast et al. | 439/15 |
| 5,856,710 | * 1/1999 | Baughman et al. | 439/950 |
| 5,994,788 | * 11/1999 | Dobler et al. | 307/10.1 |
| 6,012,736 | * 1/2000 | Hansen et al. | 280/735 |

FOREIGN PATENT DOCUMENTS

| | | |
|---|---|---|
| 196 09 266 C1 | 2/1996 | (DE) . |
| WO 97/06976 | 2/1997 | (WO) . |
| WO 97/12783 | 4/1997 | (WO) . |
| WO 97/20710 | 6/1997 | (WO) . |
| WO 97/20711 | 6/1997 | (WO) . |
| WO 97/38876 | 10/1997 | (WO) . |
| WO 98/15428 | 4/1998 | (WO) . |
| WO 98/21070 | 5/1998 | (WO) . |

OTHER PUBLICATIONS

International Search Report, PCT/US00/06655, mailed Jul. 11, 2000.

* cited by examiner

Primary Examiner—Albert W. Paladini
(74) Attorney, Agent, or Firm—Steven M. Evans; David L. Newman (57) ABSTRACT A wireless rotating signal transducer. A control circuit is provided for transferring power and communication signals through a wireless coupling device in a vehicle steering column. A squib firing circuit transforms a high energy power signal suitable for firing an air-bag from the column side to the wheel side. A low-energy power circuit generates a signal from the column side to the wheel side suitable for operating isolated wheel side electronics, such as cruise control and the like. A pulse-encoder circuit communicates low-level control signals suitable for signaling wheel-side commands from the wheel side to the column side. The low-energy power circuit and pulse encoder circuit operate simultaneously and continuously without signal debilitating interaction.

21 Claims, 8 Drawing Sheets

COLUMN - SIDE INDUCTOR

WHEEL - SIDE INDUCTOR

ROTATING SIGNAL TRANSDUCER

TECHNICAL FIELD

The present invention relates to a rotating signal transducer for electronic signal communication In a steering column of a vehicle.

BACKGROUND

Since the advent of steering-wheel mounted air bags, the necessity of transmitting multiple electric signals between the steering wheel and the column has resulted in a series of devices generically referred to as 'clock springs', comprised of a spiral tape of multiple conductors laminated within a plastic strip, wound within a housing, through which electrical connection is made between the wheel and column circuits. As the steering wheel is turned, this tape winds and unwinds while maintaining electrical contact.

Because of the finite length of the tape, there is a limited number of turns through which the clockspring may be exercised before reaching the limit of its travel. Because of this, particular care must be taken during installation of the clockspring into the vehicle so that both the steering linkage of the vehicle and the clockspring tape are centered so that when the steering wheel is turned, the clockspring does not reach its limit before the steering system reaches its end-stops. Additionally, there is some acoustic noise associated with the motion of the tape within the housing which may be objectionable in certain applications.

The present invention relates to an connector transmission system for signal, data, and power which provides signal coupling for data transfer between a stationary housing and a rotatable hub, and in particular to efficient data transfer and signal coupling which allows for the unlimited rotation of the hub with respect to the housing.

Rotary signal transducers, or clocksprings, are used for connecting automotive steering wheel mounted electronic circuits, including switches, lights, and an airbag squib, to other sensing and control electronic circuits mounted in various other locations of the automobile.

For example, U.S. Pat. No. 5,061,195 (1991), issued to Bolen, discloses a transducer, described as a clockspring, which provides a direct electrical connection between relatively movable members in the steering apparatus of an automobile. In this type of clockspring construction, a ribbon cable is used to provide the electrical connection between the relatively movable members. The ribbon cable is constructed of conductive material which is sandwiched between two layers of mylar. The cable is loosely accommodated in a coiled state within the clockspring's housing. In addition, one end of the cable is attached to the clockspring's stationary housing and the other end of the cable is attached to the clockspring's rotatable hub.

In operation, the ribbon cable will wrap or unwrap around the hub when the hub is rotated. However, in order to prevent the cable from being damaged during rotation of the hub, no substantial tensile force can be applied to the ribbon cable while it is wrapping or unwrapping. Thus, the length of the cable determines how many times the hub can be rotated. If the hub is rotated too far in one direction, then an overwound condition is said to occur which results in a significant amount of damaging tensile force being applied to the cable.

In order to prevent excess tensile force from being applied to the cable, it is necessary for the hub to be centered when it is mounted on the steering apparatus. Centering of the hub allows for the same extent of clockwise and counterclockwise rotation of the hub before the ribbon cable becomes overwound.

If the hub is not in the centered position when the clockspring is mounted on the steering apparatus, then the cable will be damaged when it is completely wrapped and/or unwrapped around the hub while the steering apparatus is continued to be forced to turn.

To ensure that the clockspring is centered when it is mounted on the steering apparatus, external locking mechanisms are sometimes used such as those described in U.S. Ser. No. 08/285,021. These locks allow only limited rotational travel of the hub prior to the clockspring's installation. The external lock is disengaged by removing it from the clockspring and discarding it.

Likewise, internal locking mechanisms are also sometimes used in order to prevent rotation of the hub such as U.S. Pat. No. 5,171,157 (1992), issued to Bolen. An internal lock limits the travel of the hub whenever the clockspring is not mounted to the steering apparatus. The internal lock is usually disengaged by a pin or other unlocking system which is provided by the steering apparatus. The clockspring's lock will reengage whenever the clockspring is removed from the steering apparatus.

However, if the clockspring is removed from the steering apparatus and then subsequently reinstalled, both the external lock and the internal lock will fail to ensure and/or indicate when the transducers hub is properly centered.

Many devices have been proposed which provide a way of indicating if the clockspring's hub is centered. However, these devices cause an increase in the diametrical size of the transducer and/or require the use of gears or other mechanisms which have a very limited useful life due to their constant rotating or relative motion whenever the hub rotates.

In addition to the centering problems posed by the prior art clocksprings, the ribbon cable used in the clockspring produces unwanted noise due to vibration, impact, and its sliding during winding and unwinding.

Also the small cross sectional area and long length of the conductors within the multi-conductor ribbon cable pose significant limitations on electrical current flow due to voltage drop and self heating.

Additionally, sliding contacts are known in the field of rotary signal transducers, but are electrical noisy and are not sufficiently reliable for data communication transfer without error checking techniques which slow down data transfer.

Another rotating signal transducer or clockspring is provided by Ballast, et al., as U.S. Pat. No. 5810606, issued Sep. 22, 1998 and titled "Connector Transmission System For Signal Data And Power." Ballast shows an connector assembly having a housing, a hub being carried in rotatable relation to the housing; and means for signal coupling between the housing and the hub. The signal coupling can consist of means such as optical coupling, inductive coupling, radio frequency coupling, capacitative coupling, and pressure wave coupling. In addition, the connector assembly can further include power coupling which can be accomplished by sliding contacts, inductively coupled coils, capacitatively coupled electrodes, or optical transmitters and receivers on the hub and the housing. Furthermore, a method of efficiently transmitting and receiving signals between the housing and hub is provided. The method consists of (1) obtaining an input signal, by a signal driver, to produce a driven signal output; (2) coupling the driven signal output to produce a coupled signal; and (3) receiving the coupled signal, by a receiver, to produce an output signal. In addition, the method can further include decoding and encoding, respectively, of the output and input signals.

Therefore, a device is proposed which provides signal coupling between the rotating hub and stationary housing of an connector transmission assembly. This device thereby eliminates the need to center the hub and housing members and also removes unwanted audible noise associated with the conductive tape in a clockspring.

In view of the above, it is an object of the present invention to provide a hub and a housing which does not require centering.

A further object of the invention to eliminated the possibility of an overwound condition.

Still further, another object of the present invention is to provide an efficient data transfer method between the hub and the housing of an connector transmission assembly.

Another object of the present invention is to provide an efficient signal, data, and power transfer method between the hub and the housing of an connector transmission assembly, which with accompanying energy storage and suitable electronic circuitry, comprise a system for implementing a variety of reliable input and output functions on the hub member without the disadvantages of clocksprings or conventional rotary connectors.

Another object is elimination of a ferrite rotary transformer for use in communicating signals between a steering wheel and column. A ferrite rotary transformer is a high dollar item involving sophisticated machining and is fragile so that it could not withstand high shocks in its manufacture or use in an automobile steering column.

Other objects, features, and advantages of the present invention will be apparent from the following detailed description taken in connection with the accompanying drawings.

SUMMARY OF THE INVENTION

According to the present invention, a radio frequency communications system is provided in an automobile steering system for sending a high-power signals across an inductively coupled circuit from a steering column to a steering wheel for firing an air bag squib, providing driver communications (such as cruise control command signals) from the steering wheel back through the rotary transformer to the steering column, and providing power for wheel-side electronics that comprise the driver controlled communications devices.

In further accord with the invention, the system employs parallel, coupled radio-frequency inductors which provide uniform coupling between the primary and secondary side regardless of relative rotational angle between the primary and secondary transformer halves.

One feature of the invention is that the transformer is of a sufficiently small size that it can be practically integrated into a steering wheel/column structure, yet it is able to transfer the several amperes required to fire an air bag squib element.

These and other objects, features and advantages will become more apparent in light of the following text and drawings.

DETAILED WRITTEN DESCRIPTION OF PRESENTLY PREFERRED EMBODIMENTS

Figure 1:
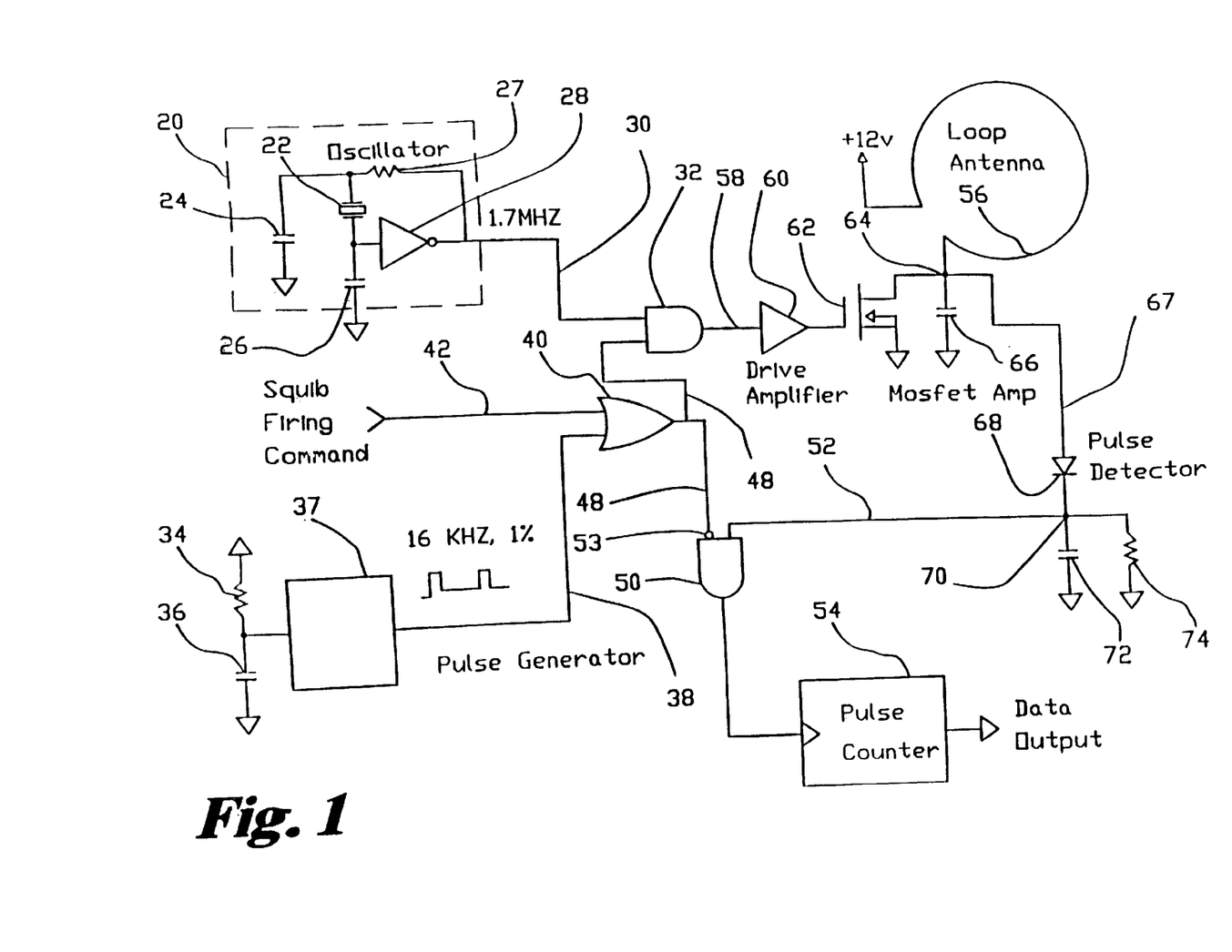
FIG. 1 is a circuit diagram of the column side of the present invention.
Figure 2:
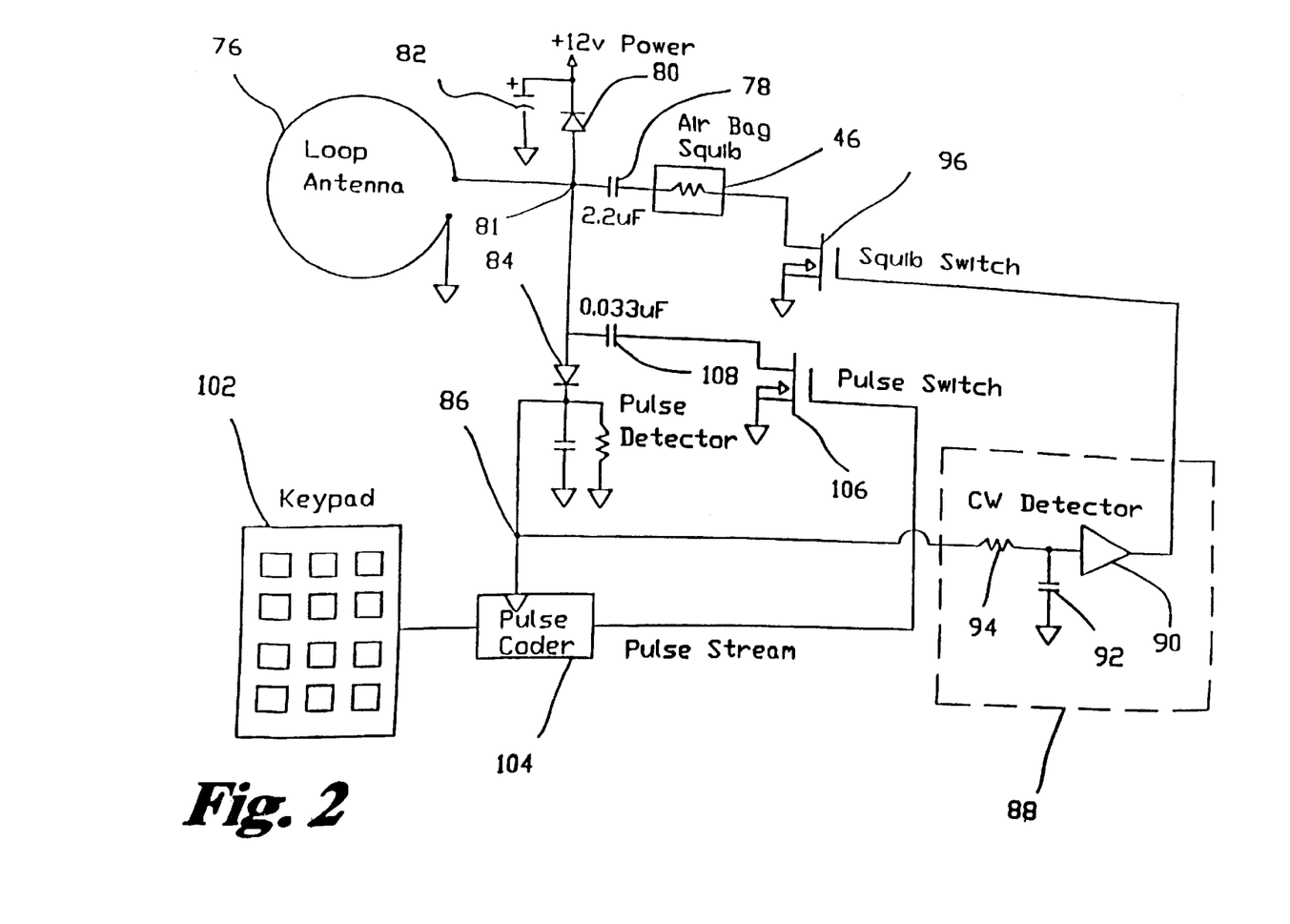
FIG. 2 is a circuit diagram of the wheel side of the present invention.
Figure 3:
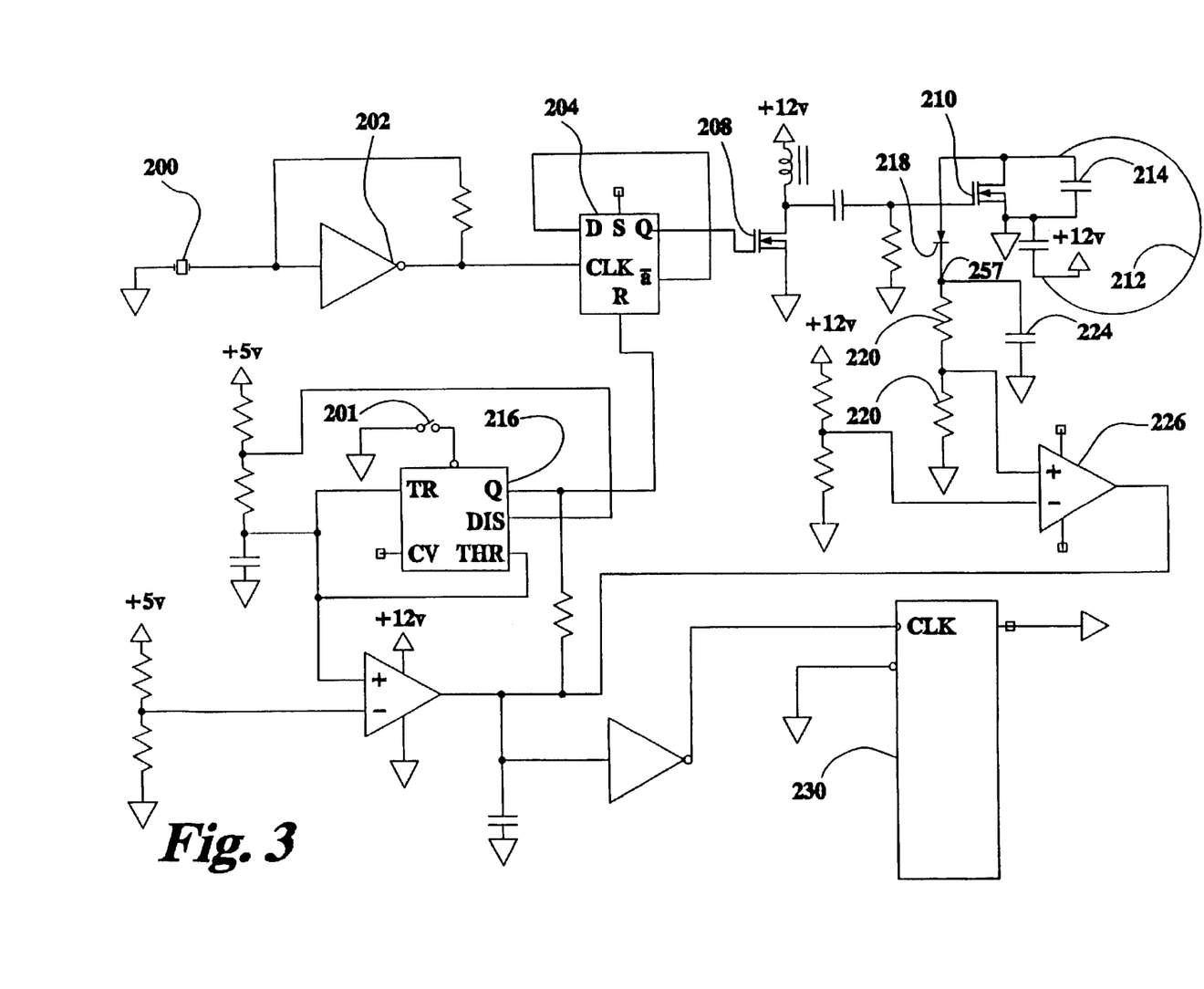
FIG. 3 is a circuit diagram of the column side of the present invention of an embodiment which is alternative to that of FIG. 1.

In FIG. 1 is a column circuit 1 which transceives RF signals with a wheel circuit 2 in FIG. 2. FIG. 3 shows an alternative column circuit 3 which transceives with an alternative circuit 4 shown in FIG. 4.

In FIG. 1, an oscillator 20 includes a crystal 22, capacitors 24, 26, resistor 27, and driver 28 for providing a 1.78 MHz clock signal on line 30 to an AND gate 32. Meanwhile, paralleled resistor and capacitor 34, 36 are tied to the input of standard 555 timer 37, timer 37 for providing a 16 KHz signal of one percent duty cycle on a line 38 to OR gate 40. OR gate 40 is also responsive to a squib firing signal provided on line 42. Squib firing signal on line 42 is provided by a circuit (not shown) which is external to that of the present invention for indicating that the squib 46 (FIG. 2) should be fired to inflate an airbag (not shown) in a vehicle.

In one embodiment, OR gate 40 performs an OR function on the squib firing signal provided on line 42 and the 16 KHz clock signal provided on line 38 for providing an OR signal on line 48. The OR signal provides a logic level high when the 16 KHz signal is high or provides a high signal when the squib firing signal on line 42 is high. The OR signal provided on line 48 is sent to AND gate 32 and an inverted input of another AND gate 50 which ANDS the OR signal on line 48 with a pulse detection signal provided on line 52 to provide a first AND signal to a pulse counter 54. The pulse counter 54 counts pulses received on a column radio frequency (RF) antenna 56 which is sent from a wheel side electronic circuit(FIG. 2). These pulses are RF pulses indicative of a switch selected on the steering wheel, such as cruise control, defrost, etc.

The OR signal on line 48 is also provided to AND gate 32 which ANDs the OR signal with the 1.78 MHz clock signal for providing a second AND signal on a line 58 to a driver 60 which provides it to a MOSFET 62. Depending on the state of the AND signal on line 58, MOSFET 62 gates either a command for squib firing or a simple clock signal to node 64 of RF antenna 56. Node 64 is coupled to a drain capacitor 66 (0.033 microfarad) and on line 67 to a pulse detecting diode 68.

The voltage on the node 64 represents the envelope of the drain signal on the MOSFET 62 such that switch pulses provided from the wheel circuit appear as voltage peaks at this node 64. For example, selection on the wheel circuit of a switch #5 might produce a series of six voltage pulses at node 64(one for error checking and five to indicate the switch number). The same system, can be used to map any kind of switch (selected on keypad 102 FIG. 2) to a number of pulses provided to the column side circuitry of FIG. 1.

The resonant frequency of the coupling of the drain capacitor 66 and RF column antenna 56 is 1.78 MHz. Pulse detecting diode 68 provides a pulse detection signal to node 70 to AND gate 50. Node 70 is tied to a low pass filter made up of paralleled capacitor 72 and resistor 74. Pulse detector 68 detects not only pulses sent by the wheel side switches on keypads 102 but also pulses sent by the wheel side electronics through MOSFET 62. To discriminate against those pulses, which would otherwise inaccurately cause the wheel side electronics to appear to be selecting switches, line 52 is provided to AND gate 50 with one inverted input 53 so that all other pulses coming from RF column antenna 56 on FIG. 1 pass through gate 50 and into pulse counter 54. Pulse counter 54 is configured to recognize adjacent pulses. A sequence of delayed pulses at 16 KHz interleaved with supervisory standby 16 kHz pulses is recognized as valid data communicated by selection of a switch on the wheel circuit and communicated to the column circuit of FIG. 3.

In a first mode of the invention, a squib firing command on line 42 is ANDed at first AND gate 32 with the 1.78 MHz signal provided on line 30 for switching the MOSFET 62 to continuous mode for firing the air bag squib 46. In a second mode, OR gate 40 provides a logic "1" when squib firing command on line 42 is low but the 16 KHz signal is provided on line 28 by timer 37. This causes AND gate 32 to gate the 1.78 MHz signals when the 16 KHz signal is provided to AND gate 32. The result in this supervisory standby mode is that low-duty pulses of the 1.78 MHz signal are provided through MOSFET 62 and to antenna 56 during the periods of the 16 KHz signal. These pulses are what power the wheel side circuit shown in FIG. 2.

RF antenna 56 receives signals from the column side circuit for providing either power signals via the state of the AND signal provided on line 58 or a squib firing command if the AND signal on line 58 includes a squib firing command. RF antenna 56 also receives signals provided by the wheel side switches (on keypad 102, FIG. 2) for indicating various states such as cruise control selected, cruise control de-selected, etc. The RF antenna 56 inductance is nominally 0.1 microHenry.

In FIG. 2, wheel RF antenna 76 is responsive by means of inductive coupling to column RF antenna 56 to squib firing RF signal and a supervisory standby signal for providing these signals to the wheel side circuit shown in FIG. 2. These are two inputs into the circuit of FIG. 2. A third input is provided to the RF antenna 76 from keypad 102. Keypad 102 can be as shown or any one of another number of means for entering commands. Equivalent to keypad 102 would be a multi-function switch or any other switch by means of which an automobile passenger enters commands on a steering wheel assembly to be conveyed to the column side circuit. These commands could include but not be limited to: cruise control select/deselect, any one of a number of signal for controlling audio or video equipment including a station, song or video selected on a CD, a telephone number to be dialed or recalled whether the number is a voice number or fax number, an email address, internet address, command to control headlights passenger compartment overhead lights, dimmer lights, defrost command, defog command, or a command to open, close or control a software application on a car's computer, be that computer inboard or external.

RF energy received at the wheel RF antenna 76 is rectified by diode 80 connects to the 12 volt buss and energy storage capacitor 82. Capacitor 82 tends to shunt the RF signal out of the 12 volt line to reduce EMI.

This 12 volt source supplies power to the wheel circuit of FIG. 2. Another rectifying diode, a pulse detector diode 84 looks for the output of the wheel RF antenna 76, specifically the envelope of the signal on that antenna 76. That signal is used as a clock for the logic on the wheel side circuit. It is provided from node 86 to a continuous wave detector 88. Continuous wave detector 88 includes a comparator 90, a capacitor 92, and a resistor 94, and looks for steady state constant amplitude continuous signal corresponding to the squib firing signal on the RF column antenna of FIG. 1. At that time, continuous wave detector 88 drives high a MOSFET squib switch 96. In the 'on' state, squib switch MOSFET 96 provides a low impedance path for RF current to pass through the loop antenna 76, a larger capacitor 98(2.2 microFarads), through the squib 46 through the MOSFET 96 to ground. If the squib switch MOSFET 96 is in the 'off' position, it presents a high impedance path to current through the same circuit so that the squib 46 is not fired. If the continuous wave detector were not here to control MOSFET 96, then energy from the supervisory standby pulses would be diverted to the squib instead of the wheel side control circuit.

When a key on keypad 102 is pressed, a switch signal is sent to pulse coder 104. The pulse coder 104 generates a sequence of pulses that are interleaved with the energy pulses detected by the loop antenna 76, the 16 KHz, 1% duty signal pulses. The pulse coder 104 generates pulses between these 16 KHz pulses generated by the column side circuit shown in FIG. 1. These pulses activate the pulse switch MOSFET 106 which presents the lowest impedance path for the 0.033 microfarad capacitor 108 through the wheel RF antenna 76 back to ground. Normally, 12 volts is the potential maintained across the 0.033 microfarad capacitor 108. When the pulse switch MOSFET 106 is driven 'on' the capacitor 108 discharges its energy through the wheel RF antenna 76 which is inductively detected by the column RF antenna 56 (FIG. 1) where it is detected by the pulse detection circuitry and recognized as a switch activation.

During data transfer, the detector 88 does not detect any pulsing so its output is low and therefore squib switch 96 is not 'on'. If detector 88 does detect energy coming from loop antenna for squib firing, it drives squib switch 96 such that the amount of energy that passing through the capacitor 108 is extremely low if the keypad 102 has been activated during this time. Thus, debilitating interference between squib firing and switch selection is avoided.

The 16 KHz signal is applied to the column side MOSFET 62 which activate it so that MOSFET 62 is driven to excite the column RF antenna 56 to place RF energy in a resonant circuit which is coupled to the wheel circuit where this energy is rectified by a diode 80 and stored in a capacitor 82 for providing a nominal 12 volt signal for the logic on the wheel side.

The wheel side switching pulses sent by keypad 102 are evenly interspersed among the 16 KHz pulses and correspond to the number of the wheel side switch pressed. These pulses discharge column side capacitor 214, the 0.033 microfarad capacitor, so that clock RF antenna 212 on where the pulse is detected by the pulse detector diode 218 and counted 230 so that the data can be presented to the vehicle computer. Pulses every 60 microseconds are supervisory standby pulses seen by comparator 226 from the column side.

For noise immunity, single isolated pulses are ignored for the purpose of switch identification logic. Only two sequential pulses are considered as having data since one pulse might be just noise. Therefore, if one depresses switch 6, one sees 7 sequential pulses beginning 30 microseconds after the reception of the primary side pulses. As stated before, inverter 53 ensures that the column circuit ignores pulses it generated itself and looks for pulses in the period between supervisory standby pulses.

Figure 4:
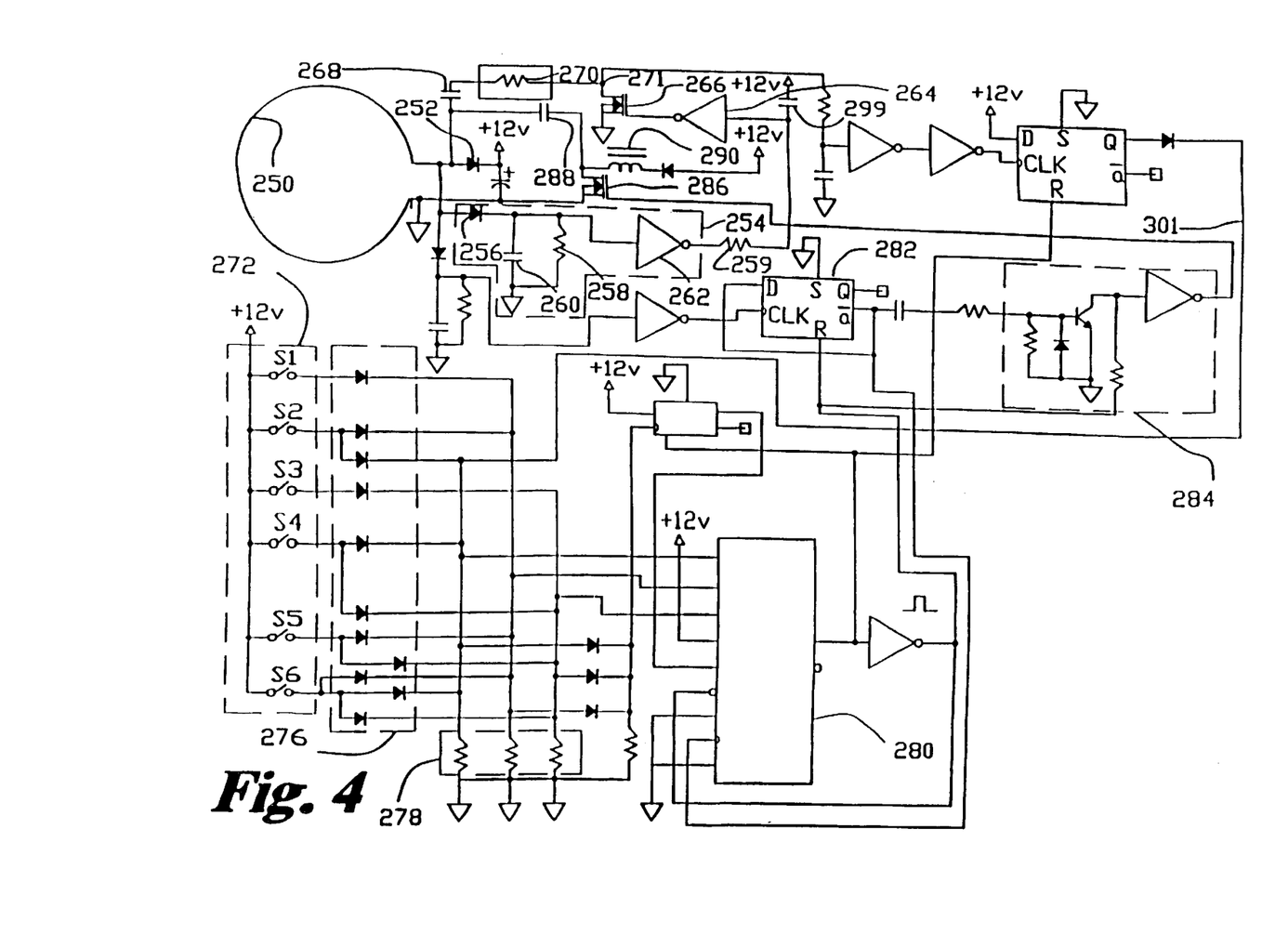
FIG. 4 is circuit diagram of the wheel side of the present invention of an embodiment which is alternative to that of FIG. 2.

FIG. 3 is a column side circuit diagram; FIG. 4 is a wheel side circuit diagram. Diode 218 aids in pulse detection. The voltage on the common node 257 of diode 218, capacitor 224 and resistor 220 is the peak envelope of the drain signal on MOSFET 210 that when we are firing MOSFET 210 in supervisory standby pulses are seen at the rep rate (16 KHz) at that node and when switch pulses are generated on the wheel circuit those pulses will also show up at this node 257.

Voltage divider 220, 222 provides a reference against which this other signal is compared and comparator 226 5V provides a logic level signal that corresponds to these pulses that are detected in the pulse detector circuit.

The detected pulse signal is gated against pulses which are detected in our pulses detected at 218 to discriminate supervisory standby pulses so that signal feeding the pulse counter 230 is a series of pulses corresponding to wheel side switch events. Up counter 230 receives these events from the wheel side and counts to indicate a particular switch.

Because of a tank circuit formed by antenna 250 and drain source capacitor 260 acts as band pass filter which attenuates frequencies which might interfere with RF reception of radio equipment within the vehicle. Similarly, housing for antennae 212, 250 should include an RF shield.

There is a need for series impedance common mode choke 290 on the 12 volt input on the column side with some degree of conductive emissions out of the circuit to complement the RF shielding.

Keypad 102 is responsive on a line 80 to power provided from the column side circuit of FIG. 1. Keypad 102 provides a digital signal on line 84 indicative of the key selected to a pulse coder 86. Pulse coder 86 provides a pulse stream to a second MOSFET 90 which is tied through a small capacitor 92 to the RF antenna 76. Small capacitor 92 has an exemplary value of 0.033 microfarads.

Like the assembly of FIGS. 1, 2, the circuit of FIGS. 3, 4 operates in three modes. The first mode is the squib firing mode. In this mode, the transistor 210 of FIG. 3 forms a radio-frequency power amplifier circuit on the primary column side circuit and is driven at a nominal frequency in the 1.78 MHz range. The FIG. 3 components 212 and 214 comprise a resonant tank circuit so that the power amplifier is operated in a highly efficient, Class-E mode. Through the circuit described herein operates at an RF frequency of 1.78 MHz, the operational frequency of this circuit is by no means limited to this value. The upper bound of operation frequency of the invention will be the resonant frequency of the loop antenna and the drain source capacitance of the power amplifier MOSFET, with no external capacitance. The lower bound of operating frequency is that at which the efficiency of energy transfer from column to wheel circuits becomes objectionably low. In practice this range includes frequencies of 1 to 10 MHz. RF column and wheel antennae 212, 250 of both wheel and column side circuits are single-turn, flat, parallel, coaxial loops of conductive material mounted within a clockspring housing(not shown). In normal operation the power amplifier circuit places a 24 volt peak-to-peak RF waveform across column antenna 212 of FIG. 3. On the secondary, wheel side circuit, its inductor 250, by virtue of its close proximity to the column-side circuit's antenna 212, has impressed upon it a 24 volt peak-to-peak RF signal. In FIG. 4, the wheel circuit, the average amplitude of this signal is detected by the circuit comprised of diode 256, capacitor 260, capacitor 299, resistor 258 and resistor 259. If the average amplitude of this signal exceeds a threshold, the AC switch 210 is driven into conduction, placing the squib 270 across the wheel RF antenna 250. This allows the RF current from the column antenna 212 to flow through the squib 270, firing it.

In the second mode, a low average power signal is passed from the column (FIG. 3) to wheel side (FIG. 2) electronics. The drive signal to the power amplifier transistor 210 is modulated by the (555) pulse timer 216 at a nominal 16 KHz signal, at a low percentage of duty, roughly 1%. This sends a small amount of energy from the column side (FIG. 3) to wheel side (FIG. 4) circuits, where the RF signal is rectified by the rectifier diode 252 of FIG. 4. This provides a nominal 12 VDC level for use in the wheel side control circuitry of FIG. 4.

The third mode of operation allows transmission of information regarding wheel-side switch closures across the antenna to the column side circuitry for vehicle control. When a wheel-side control switch is pressed, a sequence of pulses is generated which are timed so as to fall between the primary-side power pulses. The quantity of these pulses corresponds with a number assigned to the switch closed. These pulses, of approximately 2 microseconds in duration, are applied to the gate of a MOSFET 286 which is coupled to the wheel RF antenna 250 through capacitor capacitor. This excites a resonance in the primary-side tank circuit comprised by clock antenna 212 and capacitor 214, which can be detected by a peak-detector/comparator circuit using diode 218. By counting the sequential pulses, the corresponding wheel-side switch closure is deduced.

In FIG. 3, a crystal oscillator comprised of oscillator 200 and driver 202 provides a clock signal for the system. The frequency of this signal is halved in D flip-flop 204. The output of D flip flop 204, a nominal 1.78 MHz logic-level square-wave, gates MOSFET 208. This amplifies the signal to a nominal 24 volt peak-to-peak signal which is applied to the gate of power amplifier MOSFET 210. This device 210 operates as a Class-E power amplifier in conjunction with resonant components column RF antenna 212 and capacitor 214. This allows MOSFET 210 to operate as a power amplifier with low switching losses and efficiency exceeding 75%.

In the squib firing mode, the power amplifier 210 is operated in a continuous-wave mode In normal operation, the only purpose of the power amplifier circuit 210 is to provide power to the wheel-side logic circuitry. In this mode, the power amplifier 210 is modulated at a 16 KHz, 1% nominal duty waveform. This modulating signal is generated by clock circuit 216, a 555 timer. Resetting timer 216 forces power amplifier 210 into continuous mode for squib firing 270.

To detect control pulses from the wheel-side circuitry, a peak detector comprised of diode 218, resistor 220, resistor 8 222, capacitor 224, and comparator 226 observes resonant pulses at the drain of MOSFET 210. This pulse signal is muted during MOSFET 210 drive pulses so as to detect only those pulses from the wheel side circuit. These pulses feed a counter 230. By counting the number of consecutive pulses from the wheel side circuitry, we may determine which wheel-side control switch has been pressed. This information is relayed to the vehicular control electronics.

In FIG. 4, power pulses from the column circuitry in FIG. 3 are received at wheel RF antenna 250 and rectified at diode 252 to provide a nominal 12 volts for the wheel circuitry of FIG. 4.

The charging pulses which arrive from the column side circuitry of FIG. 3. are detected in peak-detecting circuitry 254 comprised of diode 256, resistor 258, capacitor 260 and driver 262. This peak detecting circuit 254 produces a series of pulses of width proportional to those of the charging pulses. If the power amplifier circuit 210 (FIG. 1) is operated in a continuous mode as it would in response to a squib firing command, the output of driver 262 goes low, causing the output of driver 264 to go high, which drives into conduction MOSFET 266, which closes the circuit for current conduction through wheel RF antenna 250, capacitor 268 and air bag squib 270.

At the left hand side of FIG. 4 is a bank 272 of six switches 274 which correspond to steering wheel controls. A matrix 276 of diodes encodes the closure of any of switches 274 into a binary coded signal on resistors 278. This information is loaded into the counter 280, and enables a pulse circuit consisting of D flip flop 282 and bipolarjunction transistor 284. This circuit sends a series of 10 microsecond pulses to the gate of MOSFET 286 alternating between charging pulses from the column side circuit of FIG. 3. The count on counter 280 is decremented with each pulse, until its count is zero; hence with a closure of a switch 274, a number of pulses is produced corresponding to the number of the switch 274 pressed. (This is analogous to the pulse-dialing method used in telephone circuits.) When MOSFET 286 is pulsed into conduction, it causes the discharge of capacitor 288 through wheel RF antenna 250. This inductively causes a resonance of the power amplifier tank circuit in the column side circuitry which is detected in its pulse counter circuit 230. At the end of each pulse, the capacitor 288 is recharged to 12 volts through reset inductor 290 to discharge energy at the next pulse from MOSFET 286.

Figure 5:
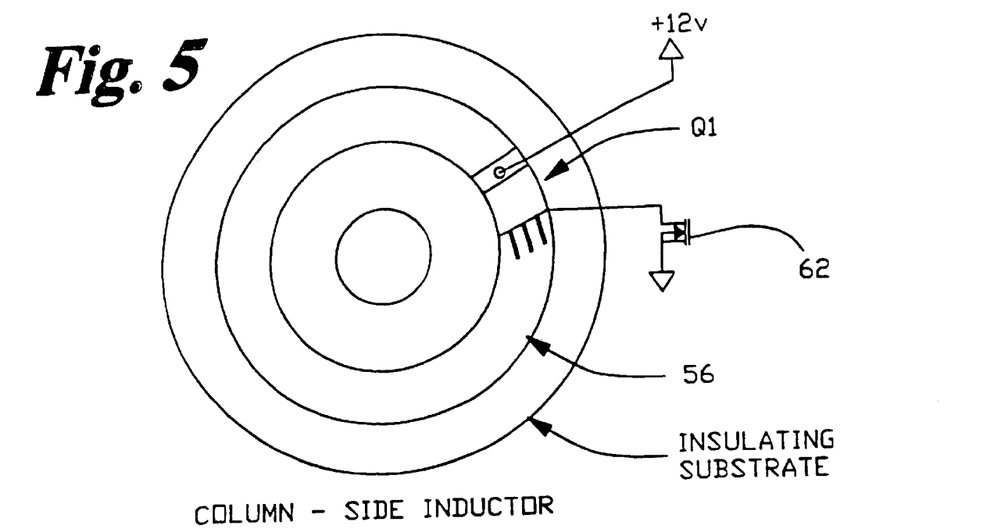
FIGS. 5 and 6 show column and wheel side RF antennae of the present invention.
Figure 6:
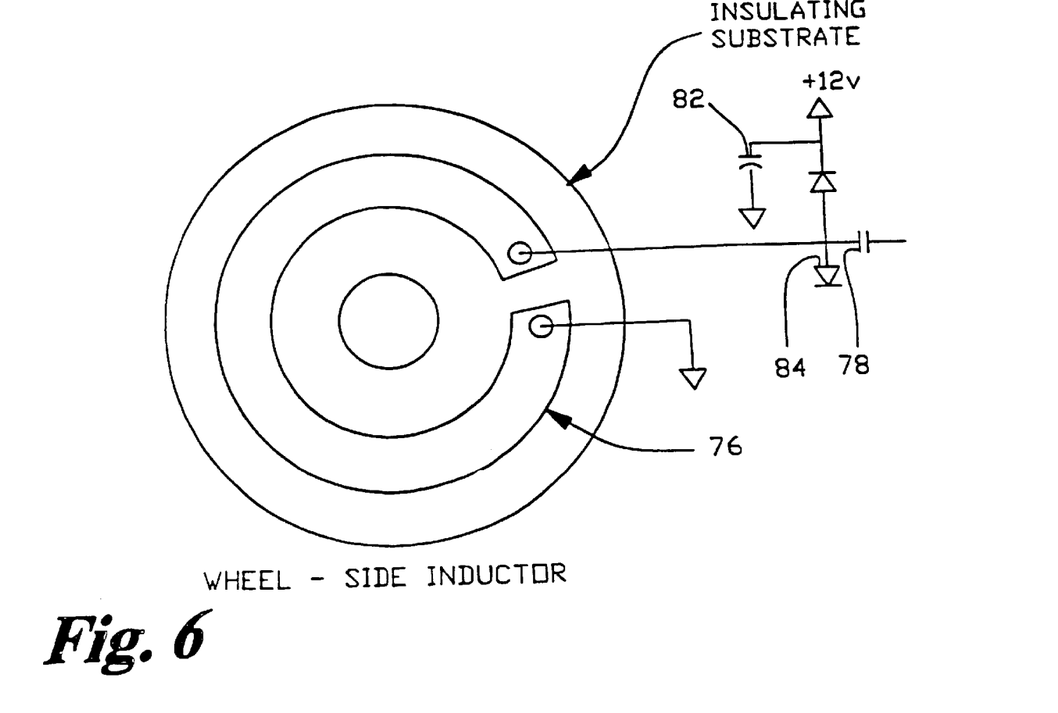

FIGS. 5, 6 show a detail of the construction of the antennae 212, 250 of each circuit of FIG. 3, 4. FIG. 5 shows transistor 210 as a TO-220 package transistor. The antenna 212, 250 may be constructed of copper-clad printed-circuit material with the trace remaining for the inductor. The antenna is a single turn, approximately four inches diameter, and 0.5 inch radial conductor thickness. The two antenna are mounted closely within the clockspring housing with a minimal air gap between them. The circuit will operate well with up to a 3 mm gap between the antenna 212, 250. The power amplifier transistor MOSFET 210 of FIG. 1 must be mounted directly within the gap of its associated antenna so as to minimize parasitic inductance.

Because of the potential for radiation of electromagnetic energy from this circuit, the clockspring housing must be shielded with a conductive material.

Figure 7:
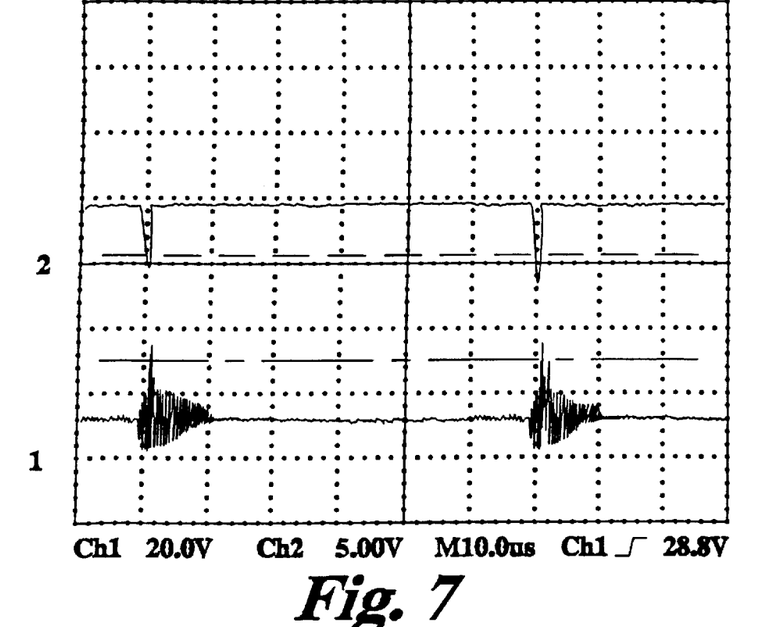
FIG. 7 shows the operation of the circuit during the supervisory/standby mode.

FIG. 7 shows the operation of the circuit during the supervisory/standby mode. The upper waveform, Channel 2, is the output of the pulse timer 230 on the column side of the circuit. This timer 230 is set up as a pulse generator, producing a narrow pulse at a nominal 16 kHz rate. This output enters the 74HC4013 D flip-flop 204. The low-going pulse signal removes the reset signal from flip flop 204, allowing it to act as a frequency divider, halving the frequency of the clock signal, the crystal oscillator circuit 200. The result if that the output of flip flop 204 is a 1.78 MHz pulse modulated signal, which is amplified by driver 208 and applied to the gate of MOSFET power amplifier 210. The lower waveform, channel 1, is the drain waveform of this MOSFET 210.

Figure 8:
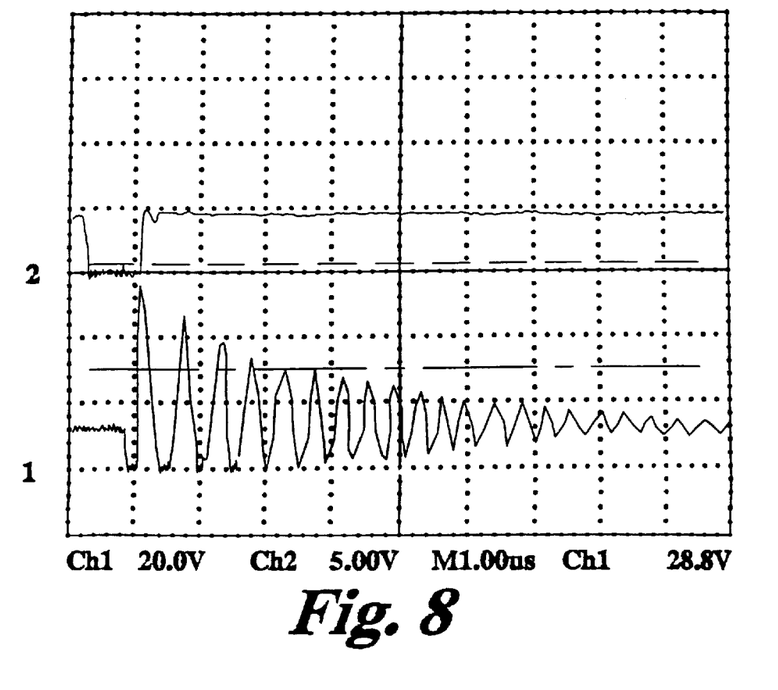
FIG. 8 is a time expanded view of the above waveform.

FIG. 8 is a time expanded view of the above waveform. The upper waveform is the pulse timer signal, the lower waveform is the drain waveform at MOSFET 210. Notice the resonant character of the lower waveform, which is due to the action of capacitor and the loop antenna inductor.

Figure 9:
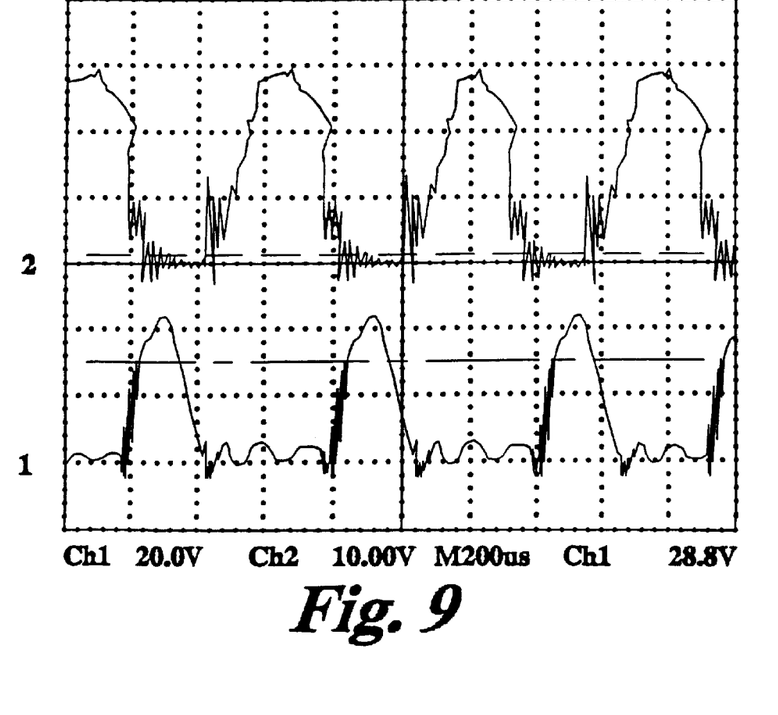
FIG. 9 is a waveform that depicts operation of the circuit in squib firing mode.

FIG. 9 is a waveform that depicts operation of the circuit in squib firing mode. The upper waveform is the signal at the drain of the RF driver, MOSFET 286, and the lower waveform is the signal at the drain of the power amplifier MOSFET 210. In this mode, the pulse generator is disabled, allowing the RF power circuitry to operate in continuous wave format.

Figure 10:
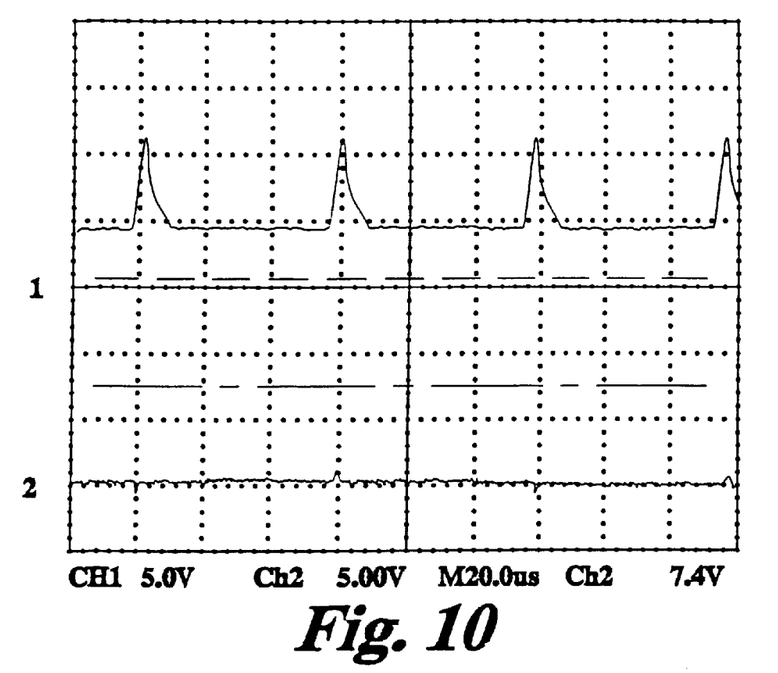
FIG. 10 is a sequence of diagrams showing the action of the pulse detection circuitry on the column side.

FIG. 10 is a sequence of diagrams showing the action of the pulse detection circuitry on the column side. The upper waveform shows the voltage at the common mode of diode 218, resistor 220, and capacitor 224 on the column side. The resonant pulses on the drain of MOSFET are rectified by diode 218 resulting in this sequence of pulses.

Figure 11:
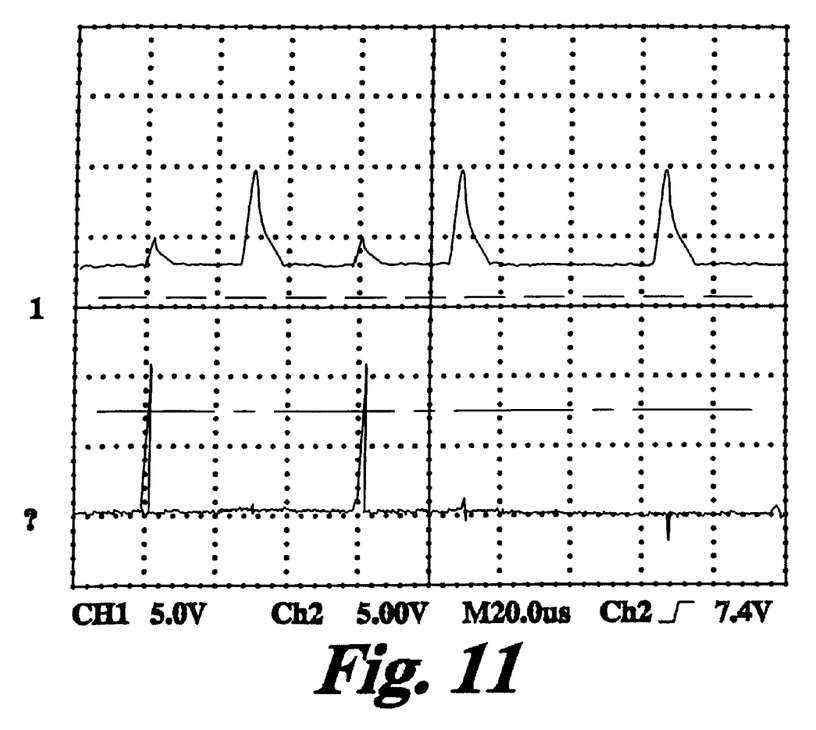
FIG. 11 shows that when a switch is closed on the wheel side circuit, a sequence of resonant pulses is impressed upon the secondary of the loop antenna circuit.

FIG. 11 shows that when a switch is closed on the wheel side circuit of FIG. 2, a sequence of resonant pulses is impressed upon the RF wheel antenna. The lower waveform is the wheel side pulse sequence, which interleaves the column side charging pulses. The upper waveform is the output of the column side pulse detection circuit, showing the corresponding detected pulses which interleave the larger charging pulses.

It should be understood that various changes and modifications to the presently preferred embodiments described herein are apparent to those skilled in the art. Such changes and modifications may be made without departing from the spirit and scope of the present invention and without diminishing its attendant advantages.

What is claimed is:

1. An inductive power and airbag firing circuit for a vehicle steering column, comprising:

a first loop antenna to be placed around a vehicle side of a steering column;

a second loop antenna to be placed around a steering wheel side of the steering column, parallel to the first loop antenna, wherein a gap is to be present between the first and second loop antennas;

an oscillating signal generator circuit to be located on the vehicle side of a steering column for transmitting squib firing signal via the first loop antenna at a predetermined frequency for firing a squib of an airbag;

a timer to be located on the vehicle side of a steering column for transmitting a timer signal via the first loop antenna at a predetermined frequency for proving power to a power receiving circuit;

a power receiving circuit to be located on the steering wheel side of the steering column for inductively receiving the timer signal via the second loop antenna, and converting the received oscillating signal into power for control circuits on the steering wheel side of the steering column; and a squib firing circuit to be located on the steering wheel side of the steering column for firing an airbag squib in response to a received squib firing signal inductively received via the second loop antenna.

2. The inductive power and airbag firing circuit of claim 1, wherein the first loop antenna includes a single loop of conductive material.

3. The inductive power and airbag firing circuit of claim 1, wherein the second loop antenna includes a single loop of conductive material.

4. The inductive power and airbag firing circuit of claim 1, wherein the gap between the first and second loop antennas is approximately three millimeters.

5. The inductive power and airbag firing circuit of claim 1, wherein the first loop antenna includes a single loop of wire.

6. The inductive power and airbag firing circuit of claim 1, wherein the second loop antenna includes a single loop of wire.

7. The inductive power and airbag firing circuit of claim 1, wherein the timer signal is approximately 16 KHz.

8. The inductive power and airbag firing circuit of claim 1, wherein the oscillating signal generated by the oscillating circuit is approximately 1.7 MHz.

9. The inductive power and airbag firing circuit of claim 1, further comprising:
   switches to be located on the steering wheel side of the steering column for generating a unique pulse signal, corresponding to a closed switch, to a pulse coder; and
   a pulse coder to be located on the steering wheel side of the steering column for generating a predetermined number of pulses in response to a received unique pulse signal.

10. The inductive power and airbag firing circuit of claim 9, further comprising:
    a pulse counter to be located on the vehicle side of the steering column for counting received pulses of the pulse coder and generating a corresponding output signal.

11. The inductive power and airbag firing circuit of claim 1, further comprising:
    a transistor to be located on the vehicle side of the steering column for transmitting a squib firing signal and a clock signal from the timer to the first loop antenna.

12. The inductive power and airbag firing circuit of claim 11, wherein the transistor is a MOSFET.

13. The inductive power and airbag firing circuit of claim 1, further comprising:
    a pulse detector diode to be located on the vehicle side of the steering column between the first loop antenna and the pulse.

14. The inductive power and airbag firing circuit of claim 12, further comprising:
    a continuous wave amplifier for driving the MOSFET to be located on the vehicle side of the steering column.

15. An inductive clockspring to be located on the steering column of a vehicle for powering steering wheel controls and firing an airbag during a crash, comprising:

a first loop antenna to be placed around a vehicle side of a steering column;

a second loop antenna to be placed around a steering wheel side of the steering column, parallel to the first loop antenna, wherein a gap is to be present between the first and second loop antennas;

an oscillating signal generator circuit to be located on the vehicle side of a steering column for transmitting squib firing signal via the first loop antenna at a predetermined frequency for firing a squib of an airbag;

a timer to be located on the vehicle side of a steering column for transmitting a pulsed timer signal via the first loop antenna at a predetermined frequency for proving power to a power receiving circuit;

a power receiving circuit to be located on the steering wheel side of the steering column for inductively receiving the timer signal via the second loop antenna, and converting the received oscillating signal into power for control circuits on the steering wheel side of the steering column; and a squib firing circuit to be located on the steering wheel side of the steering column for firing an airbag squib in response to a received squib firing signal inductively received via the second loop antenna.

16. The inductive clockspring of claim 15, wherein the inductance for the first and second loop antennas is approximately 0.1 micro Henry.

17. The inductive clockspring of claim 15, further comprising:
    a matrix of switches to be mounted on the steering wheel side of the steering column for receiving input from an operator of the vehicle.

18. The inductive clockspring of claim 17, further comprising:
    a matrix of diodes to be located on the steering wheel side of the steering column, wherein a diode is electrically connected to each switch of the switch matrix for encoding a closure of any switch of the matrix of switches.

19. The inductive clockspring of claim 18, wherein the encoder is a matrix of diodes.

20. The inductive clockspring of claim 15, wherein the first and second loop antenna each include a single loop of wire.

21. The inductive clockspring of claim 15, wherein the gap is approximately 3 millimeters.

* * * * *